Oct. 15, 1968     V. O. BOWLES     3,406,112
CATALYTIC CRACKING PROCESS
Original Filed April 6, 1966     2 Sheets-Sheet 1

INVENTOR.
Vernon O. Bowles
BY
Paul J. Cook
Attorney

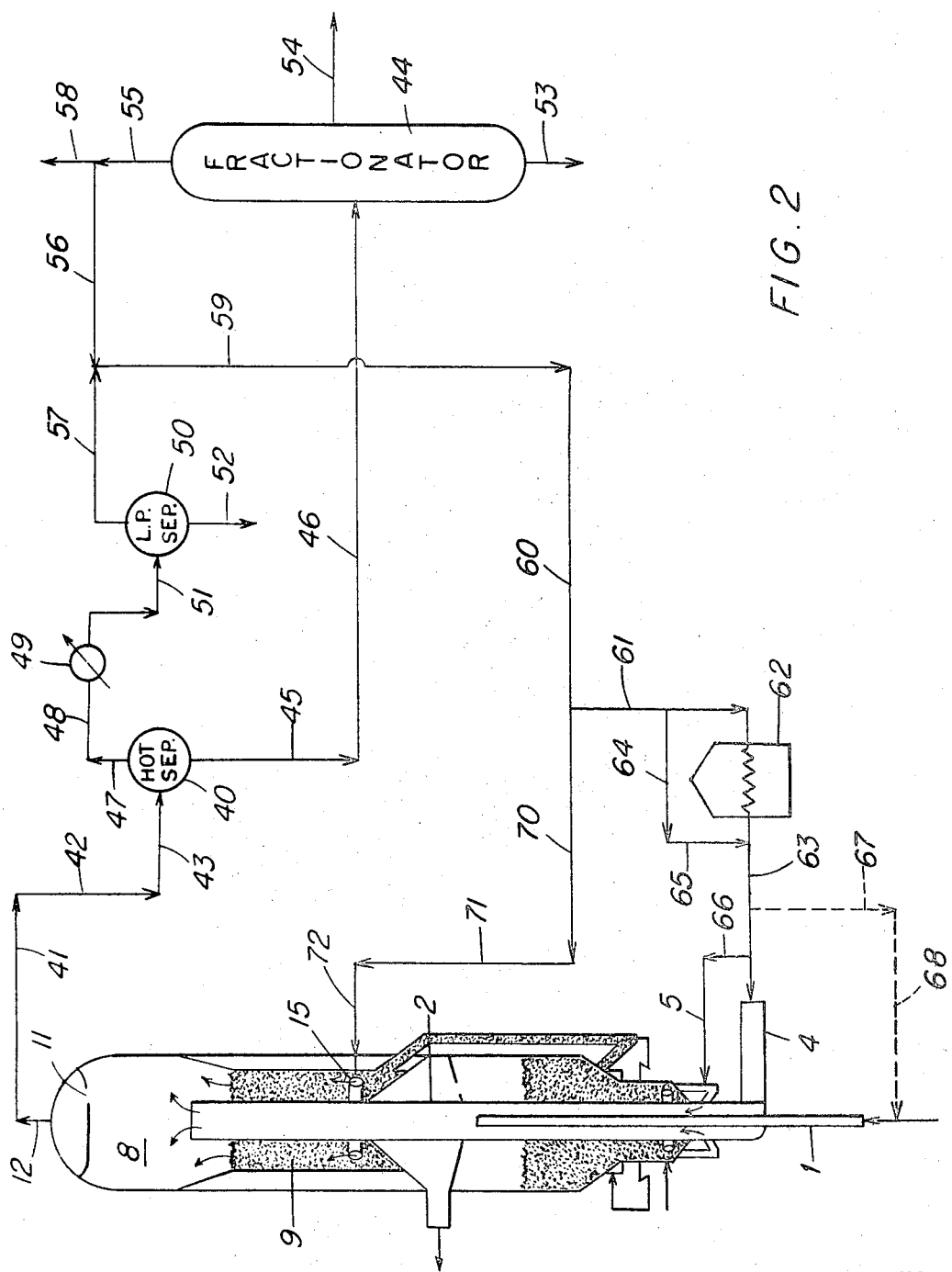

United States Patent Office 3,406,112
Patented Oct. 15, 1968

3,406,112
CATALYTIC CRACKING PROCESS
Vernon O. Bowles, Katonah, N.Y., assignor to Mobil Oil Corporation, a corporation of New York
Continuation of application Ser. No. 540,604, Apr. 6, 1966. This application Dec. 26, 1967, Ser. No. 693,676
3 Claims. (Cl. 208—153)

ABSTRACT OF THE DISCLOSURE

A cyclic catalytic conversion process wherein conversion is conducted in a riser reactor. Regenerated catalyst is mixed with a low boiling hydrocarbon lift gas in the bottom of a riser. The mixture of lift gas and catalyst is carried upwardly in the riser as a dilute phase and contacted therein with a vaporous hydrocarbon feed to effect conversion. The catalyst is separately recovered from lift gas and hydrocarbon product. The catalyst is regenerated and recycled to the bottom of the riser. The hydrocarbon product is fractionated to recover fractions including low boiling hydrocarbons which are recycled to be used as lift gas and desired hydrocarbon product. The hydrocarbon feed inlet in the riser is vertically adjustable to regulate contact time in the riser.

---

Figure 1:
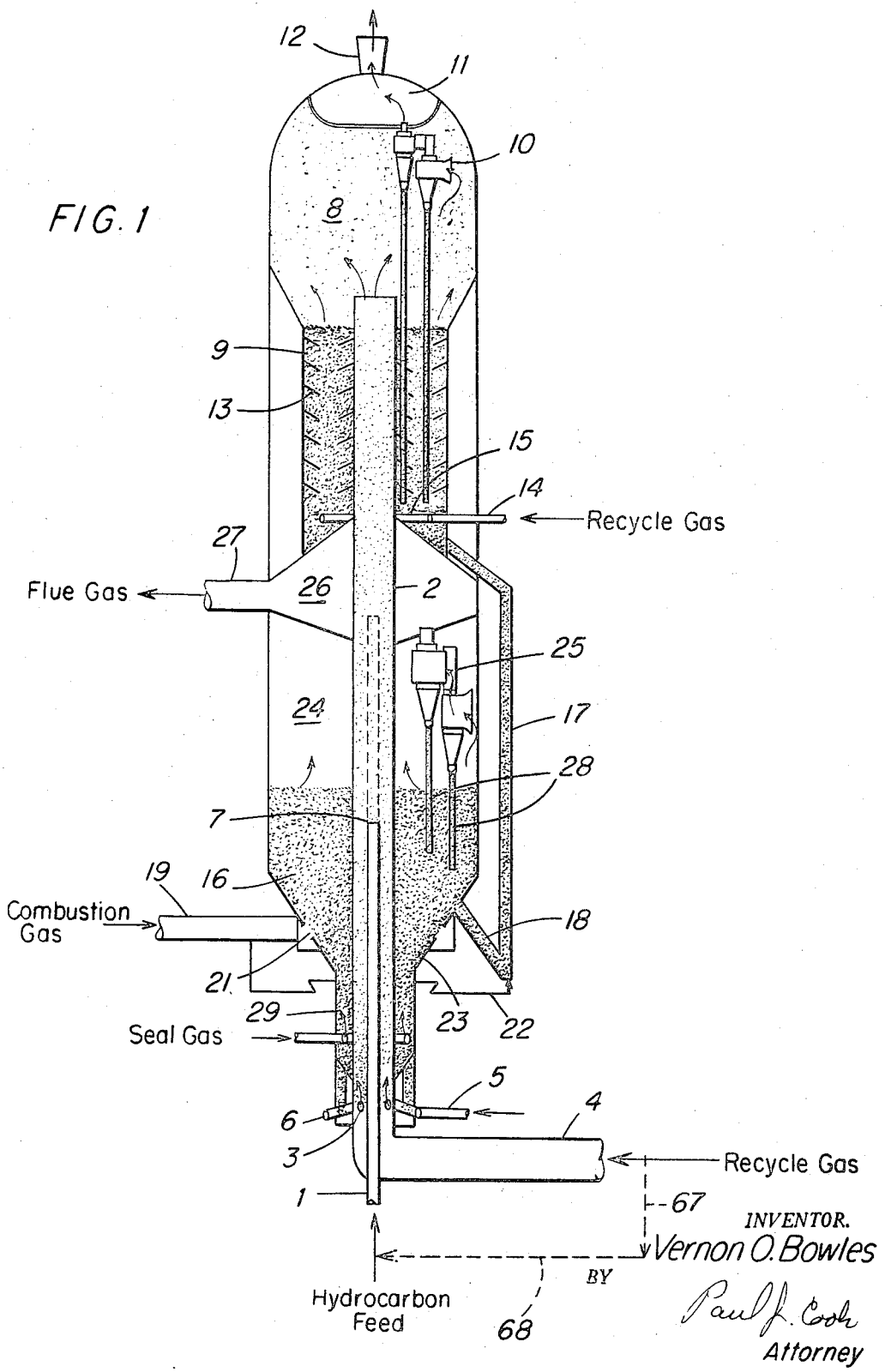

This invention relates to a method for effecting contact of finely divided solid particle material with reactant material. In one aspect, the invention is directed to improvements in the hydrocarbon conversion and the method of converting hydrocarbons to desired lower boiling hydrocarbons.

In another aspect, the invention is directed to the catalytic conversion of hydrocarbons in an arrangement of processing steps wherein a stream recovered from the conversion products is used to advantage in the system for effecting transfer of catalytic material to the reaction zone and conversion of fresh feed introduced to the process.

In presently known catalytic hydrocarbon conversion processes and catalyst handling systems, finely divided catalytic material is employed to effect desired conversion of vaporous hydrocarbons or admixtures of vaporous and liquid hydrocarbons. Subsequently, the catalyst and reaction products are separated so that the catalyst can be recycled to a regeneration zone after suitable contact with a stripping gas. Numerous variations of this cyclic arrangement have been proposed, each with its own peculiar benefits and deficiencies. However, under certain circumstances, the prior art systems are not completely satisfactory for many reasons often related to ineffective utilization of the catalytic material available for effecting the desired chemical reaction.

It is an object of this invention to provide an arrangement of processing steps for improving the utilization of an active conversion catalyst.

A further object of this invention relates to the recovery of product gaseous material for use in a hydrocarbon conversion system.

Other objects and advantages of this invention will become more apparent from the following discussion.

In accordance with the present invention, finely divided catalytic material having high cracking activity and petroleum hydrocarbons are contacted in a riser reaction zone under reaction conditions in a manner wherein a portion of the reaction products is effectively utilized to transport the catalytic material to and through the reaction zone. More particularly, in accodance with this invention, a vaporous hydrocarbon product stream comprising predominantly hydrocarbons boiling below about $C_6$ is recovered from the product effluent of a catalytic cracking operation and recycled in an amount at least sufficient to form a suspension in the riser reaction zone. The petroleum hydrocarbon to be converted which can be in the form of a liquid, a vapor or liquid-vapor mixture is directed to the riser reactor inlet. The low boiling reaction products recycled to the riser reactor inlet are used to entrain and suspend hot regenerated catalytic material and effect subsequent contact of catalytic material and petroleum hydrocarbon feed. The petroleum hydrocarbon feed and catalyst suspension are mixed in a manner to form a suspension which will effect the desired conversion. Thereafter, the suspension upon discharge from the riser reaction zone is separated to recover vaporous hydrocarbon product and hydrocarbon recycle gas effluent material from the catalytic material. The catalytic material is stripped of any entrained vaporous hydrocarbon material, regenerated, and returned at an elevated temperature to the inlet of the riser reaction zone for reuse as described above.

In yet another aspect of the present invention, the contact time between the finely divided catalytic material and hydrocarbon feed within the elongated riser reaction zone can be adjusted to regulate the desired conversion of hydrocarbon feed wtihout changing the flow rate of either catalytic material or hydrocarbon feed. This is accomplished by adjusting the location of the hydrocarbon feed inlet to the reaction. The hydrocarbon feed is introduced into the riser reactor for admixture therein with catalytic material by means of a tubular section which extends a desired vertical length therein and is vertically adjustable. Thus, within the elongated riser reaction zone, the effective reaction zone volume can be easily changed without adjusting the flow rates of either hydrocarbon feed or catalytic material feed to the elongated riser reaction zone. In this manner, reactant-catalyst contact time within the riser reactor can be easily and effectively adjusted as desired depending upon the type of hydrocarbon reactant employed.

In another aspect of this invention, the contact time between catalyst and hydrocarbon feed in the riser can be varied by varying the rate of flow of recycled product lift gas to the riser. A change in the gas flow rate to the riser effects a change in the catalyst to oil ratio in the riser which in turn effects a change in contact time in the riser at a given liquid hourly space velocity. In this manner, flexibility is available in the process of this invention which permits the processing of a variety of hydrocarbon feeds.

In a more particular aspect of the present invention, the hydrocarbon feed to be converted is directed upwardly through a tubular section within an elongated riser at a temperature suitable for conversion. The hydrocarbon feed exits from the tubular section upwardly into the riser reactor and is contacted therein with an upwardly moving suspension of finely divided catalyst under conditions to effect conversion of the feed. The catalyst suspension is obtained by contacting hot regenerated catalyst from the regeneration zone with recycled light product hydrocarbons at the lower portion of the riser reactor. This catalyst suspension mixture is directed upwardly through the annular space formed by the outside wall of the hydrocarbon feed tubular section and the inside wall of the elongated riser reactor. The hydrocarbon feed to be converted is introduced and directed upwardly in the tubular section which extends from the lower portion of the riser and through a portion of the length of the riser. The hydrocarbon feed can be subjected to forces which promote rotational movements thereof as for example by the use of swirl baffles in the tubular section. This promotes improved catalyst-hydrocarbon feed mixing. The catalyst suspension contacts the upwardly moving hydrocarbon feed at the tubular section outlet while conversion conditions of temperature, pressure and space velocity are maintained in the reaction zone. The resultant suspension of gas, catalyst and hydrocarbon feed are thus directed upwardly through the remaining length of the riser reactor with the hydrocarbon feed being converted therein to the desired hydrocarbon products. The suspension exits from the top of the riser reactor into a gas-solid disengaging chamber wherein vaporized product and recycle gas are separated from the solid catalyst. The mixture of vaporized product and recycle gas is withdrawn from the top portion of the disengaging chamber and the solid catalyst is caused to pass downwardly through a stripping zone wherein it is contacted with an upwardly moving stripping gas to separate entrained reaction product from the catalyst. It is preferred that the stripping gas used in this zone be a portion of the low boiling recycle gas used as the catalyst lift gas. In this embodiment of this invention, the stripping zone consists of an annular section which surrounds the upper portion of the riser reactor. In addition to stripping in the stripping zone, further reaction of the hydrocarbon feed occurs to produce additional desired hydrocarbon product. The stripping gas serves both to separate entrained and additionally produced conversion product from catalyst and as a seal which prevents hydrocarbon product from passing downwardly to the catalyst regeneration zone.

The catalyst is directed downwardly from the lower portion of the stripping zone to a catalyst regeneration zone wherein it is contacted with combustion air to effect burning of coke deposits thereon and thus effect catalyst reactivation. The combustion air is directed upwardly from an intermediate vertical location in the regeneration zone to contact catalyst flowing generally downwardly. A purge or sealing gas can be introduced at a point below the air inlet to strip the combustion gases from the catalyst. However, the regeneration zone can be so designed so that the oxygen content of the gas entrained in the catalyst at the catalyst outlet is inconsequential for practical purposes and thus obviates the need for a sealing medium. Combustion gases are removed from a plenum chamber in the upper portion of the catalyst regeneration zone. The downwardly moving reactivated catalyst in the lower portion of the regeneration zone is again contacted with a hydrocarbon recycle gas comprising substantially light hydrocarbons boiling below $C_6$ and is directed in admixture therewith upwardly through the elongated riser reactor as described above. The hydrocarbon lift gases can be obtained by separating as for example by phase separating or fractionation of the hydrocarbon products obtained from the reaction zone and can be used to supply a portion of the heat of reaction to the hydrocarbon feed to be converted.

In an alternative embodiment of this invention, a refractory petroleum hydrocarbon which is difficult to convert, can be directed from the bottom portion of the riser reactor in vapor phase together with hydrocarbon recycle gas to contact incoming catalyst rather than being introduced through the tubular section within the riser. In this manner the refractory vapor feed supplies a portion of the lift force to maintain the catalyst in a suspension and conversion of this refractory material is improved due to the longer catalyst-hydrocarbon contact time effected in the riser.

In the process of this invention, it is particularly desirable to employ high activity crystalline aluminosilicate catalysts having a small particle size in the range of from about 1 micron to about 500 microns either alone or in the presence of an inorganic oxide matrix to attain the advantage of increased catalyst diffusivity in the reaction zone and also to promote fluidization thereof in the regenerator. With such highly active catalyst it is desirable to maintain a short contact time between catalyst and hydrocarbon feed in the reaction zone to minimize overcracking of the hydrocarbon feed and to minimize coke formation while at the same time producing a relatively high yield of desired hydrocarbon product. In the process of this invention it is desirable to maintain hydrocarbon conversion in the range of from about 40 percent to about 90 percent to regulate coke on the catalyst leaving the reaction zone between about 0.4 percent and about 5.0 percent. The coke concentration on catalyst depends upon the catalyst to feed ratio, the hydrocarbon recycle gas to feed ratio and the temperature of the hydrocarbon recycle gas. By conversion is meant the relation of the amount of desired product made, as for example, gasoline boiling range hydrocarbons as compared to the total amount of hydrocarbon feed to be converted.

The present invention is particularly suited for use in hydrocarbon conversion processes wherein the catalysts employed exhibit unusually high cracking activity. Such catalysts include compositions containing crystalline aluminosilicates which have been base exchanged to reduce the amount of sodium ions therein, examples of which are described and claimed in U.S. Patents 3,140,249 and 3,140,253, each to Plank et al. It has been found that to derive full advantage from these catalysts, it is desirable to employ a relatively short catalyst-hydrocarbon contact time in the reaction zone thus bringing about high product selectivity while achieving high hydrocarbon conversion levels. The catalyst-hydrocarbon contact time is dependent upon the temperature, the hydrocarbon vapor residence time, the catalyst residence time and the catalyst concentration for a catalyst of given activity. It can be controlled operationally by adjusting the catalyst flow rate, the catalyst to oil feed rates, the hydrocarbon recycle gas to oil feed ratio, the hydrocarbon recycle gas and temperatures and the reaction zone pressure. As stated above, catalyst-feed contact time can be readily regulated by the process of the invention by either adjusting the position of the hydrocarbon feed inlet within the riser or adjusting the flow rate of recycled product hydrocarbons to the inlet portion of the riser. In the process of this invention, it is desirable to maintain contact time between the hydrocarbon feed and catalyst in the riser reactor in the range of from about 0.01 second to about 10 seconds and preferably from about 0.5 second to about 3 seconds. In the process of this invention the liquid hourly space velocity in the riser is maintained at least about 10 and generally above about 30. The reaction temperature is maintained between about 850° F. and 1000° F. while the pressure in the riser reactor will be maintained in the range of about 15 to 100 p.s.i.a. and preferably above about 20 p.s.i.a.

To more fully describe the present invention, reference is now made to FIGURE 1.

The petroleum hydrocarbon to be converted is introduced in a heated condition through the inlet portion of tubular section 1 and is moved upwardly therethrough. Fresh catalyst in a heated condition is introduced into the lower portion of riser 2 through ports 3 located in the walls thereof. The fresh catalyst is caused to move upwardly through the riser 2 as a suspension under the force exerted by incoming recycled product comprising predominately hydrocarbons boiling below $C_6$. The majority of recycled hydrocarbon is introduced into the lower portion of riser 2 through conduit 4 while a smaller amount of recycled gaseous hydrocarbon is introduced into the lower portion of riser 2 through conduit 5 and annular distributor 6. This smaller amount of recycled gaseous hydrocarbon provides a convenient means for regulating the flow rate of catalyst through the riser 2. The gas-catalyst suspension moves upwardly through riser 2 and contacts upwardly moving hydrocarbon feed stock at the outlet portion 7 of vertically adjustable tubular section 1. Upon contact of the hydrocarbon feed and the suspension at reaction conditions of temperature and pressure, the hydrocarbon feed is caused to vaporize, atomize and disperse to thereby promote cracking thereof. The resultant suspension of hydrocarbons and catalyst continues to move upwardly through the remaining length of riser 2 wherein hydrocarbon conversion product is formed, and into separation chamber 8.

In separation chamber 8, solid catalyst and gasiform material are separated with catalyst being directed downwardly to the top of catalyst bed in stripping zone 9. The gasiform material including hydrocarbon conversion product is removed from separation chamber 8 through cyclones 10 and plenum chamber 11 and through conduit 12. The catalyst, after promoting cracking reactions in the riser reactor 2 becomes partially deactivated due to coke laydown thereon. While the majority of the hydrocarbon feed is converted in riser 2, additional cracking thereof occurs in separation chamber 8 and in stripping zone 9.

Stripping zone 9 is annular shaped surrounding riser 2 and promotes substantially uniform downward flow of the catalyst therethrough. In the stripping zone 9, gasiform reaction product which is occluded by the catalyst is stripped therefrom by the action of upwardly moving purge gas and baffles 13. The purge gas is introduced into stripping zone 9 through conduit 14 and annular ring 15 to provide a substantially uniform flow of upward moving gas. The purge gas comprises a portion of the recycle hydrocarbon gas and serves both as a stripping gas and as a seal against combustion gas entering from the catalyst regeneration zone 16. It is desirable to employ as a purge gas a portion of the gaseous low boiling hydrocarbon product obtained from a downstream product separation step. This eliminates the need for an additional separation step which is required when regeneration flue gas is used as a stripping gas. Further, it is advantageous to use gaseous hydrocarbons rather than steam as a purge gas in stripping zone 9 since steam tends to deactivate high activity crystalline aluminosilicate catalysts. The purge gas moves upward through stripping zone 9 into separation chamber 8 and is removed therefrom with the hydrocarbon conversion product. The flow of purge gas and the flow of catalyst through the stripping zone 9 are maintained so as to prevent the upper level of the catalyst bed therein from exceeding the height of the riser reactor 2.

The stripped catalyst flows downward by gravitation from stripping zone 9 through standpipe 17 into the catalyst regeneration zone 16. Secondary combustion gas is introduced into the bottom of standpipe 17 through conduit 22 at a sufficient pressure to assist catalyst flow into regeneration zone 16 but not so high a pressure as to overcome the combined downward pressure of catalyst in the standpipe 17 and purge gas in stripping zone 9. Upon contact of relatively inactive catalyst and secondary combustion gas in conduit 18, combustion of coke is partially effected. The catalyst is directed from conduit 18 into regeneration zone 16 wherein it is contacted with primary combustion air which is directed thereto through conduit 19, annular conduit 20 and ports 21 in the wall thereof which are uniformly spaced around frustoconically shaped wall 23 of regeneration zone 16. In this manner, the primary air is directed upwardly uniformly through the catalyst bed to contact downwardly moving catalyst and effect combustion of coke thereon.

The gasiform combustion products move upwardly from the catalyst bed into the upper portion 24 of regeneration zone 16 and are exited therefrom through cyclones 25 in plenum chamber 26 and through conduit 27. The regeneration zone combustion products can be directed to a waste heat boiler to convert gases which support combustion and then can be recycled to function as a stripping gas and a seal gas as discussed below. Any particulate catalyst which is entrained in the upward moving combustion gas is separated therefrom by cyclones 25 and gravitated to the catalyst bed through standpipes 28.

As the catalyst moves downward through regeneration zone 16, the coke thereon is converted to gasiform combustion products to effect reactivation of the catalyst. The downwardly moving activated catalyst is contacted with upwardly moving stripping gas obtained from a waste heat boiler not shown. The stripping gas is introduced in stripping zone 29 to remove entrained combustion gas therefrom. The stripping gas moves upwardly through the catalyst bed in stripping zone 29 and is removed as a mixture with regeneration zone combustion gas as described above. After being stripped of combustion gas, the activated catalyst is contacted with upwardly moving recycle gaseous product and directed to riser 2 substantially as hereinbefore described.

Reference is now made to FIGURE 2.

FIGURE 2 is a simplified process flow representation showing means for obtaining and recycling a low boiling hydrocarbon product fraction to and from the reactor system. Hydrocarbon reaction products are removed from plenum chamber 11 and directed to a separation zone 40, through conduits 12, 41, 42 and 43. In separation zone 40, an initial separation is made between normally gaseous hydrocarbons and normally liquid hydrocarbons. The liquid hydrocarbons are removed from separation zone 40 and directed to fractionation zone 44 through conduits 45 and 46. The light hydrocarbon stream is directed from separation step 40 through conduits 47 and 48 to heat exchanger 49 wherein the hydrocarbons are cooled to about ambient temperature. The cooled light hydrocarbons are then directed to low pressure separator 50 through conduit 51. In low pressure separator 50, any normally liquid hydrocarbons in the light gas stream are separated therefrom. The liquid hydrocarbons are removed from low pressure separator 50 through conduit 52 and can be treated as desired, as for example in a gas plant not shown. The gas stream from low pressure separator 50 consists predominately of hydrocarbons boiling at $C_5$ and below.

In fractionator 44, the liquid hydrocarbon stream from separator 40 is fractionated to obtain hydrocarbon fractions including a heavy fraction, a gasoline boiling range fraction and a light gaseous fraction. The heavy fraction is withdrawn from fractionator 44 through conduit 53 while the gasoline fraction is withdrawn through conduit 54. The portion of the gas fraction consisting predominately of hydrocarbons boiling at $C_5$ and below is directed through conduits 55 and 56 to admixture with the gas stream directed from low pressure separator 50 through conduit 57. The remainder of the gas stream from fractionator 44 is removed from the system through conduit 58 and can be further treated as for example in a gas plant absorber.

The combined hydrocarbon gas stream is directed to various portions of the reactor-regenerator system through conduits 59 and 60. The particular flow arrangement shown for the recycled gaseous hydrocarbons is quite flexible both from the standpoint of material and heat balance within the reactor-regenerator system. The total amount of recycled hydrocarbon gas directed to the reactor-regenerator system is controlled by the amount of gas removed through conduit 59. The amount of heat added to the reactor-regenerator system is controlled by the amount of gas directed through conduit 61 and heater 62. The amount of heat added to the system is that sufficient in combination with the heat supplied by reactivated catalyst to maintain hydrocarbon conversion in the reaction zone. The heated recycle gas is directed through conduit 63 to contact reactivated catalyst in a manner described above in FIGURE 1. The remainder of the recycle gas to be used to suspend catalyst in the riser by-passes heater 62 through conduits 64 and 65. The majority of the recycled gas is directed through conduit 4 to contact reactivated catalyst and suspend the same in a manner described above. The remainder of the gas from conduit 63 is directed through conduits 66 and 5 to act as a secondary catalyst lift gas in the lower portion of riser 2. Alternatively, a portion of the recycled gas can be directed through conduits 67 and 68 to contact incoming hydrocarbon feed and lift the same into the tubular section 1.

The remainder of the recycled gas from conduit 60 is directed to stripping section 9 through conduits 70, 71 and 72 and distribution ring 15. In the stripping section, the recycled gas removes entrained hydrocarbon product and is directed upwardly into separation chamber 8. In separation chamber 8, the conversion products and recycled hydrocarbon gases from the riser 2 and the stripping zone 9 are separated from particulate catalyst and are removed through conduit 12.

It is to be understood that in the practice of the present invention the reactor and catalyst regenerator can be maintained in two separate housings as well as in the unitary housing shown in the attached drawings. Further, it is to be understood that the hydrocarbon to be converted can be introduced to the riser in vapor phase, liquid phase or as a mixed phase. Further, it is to be understood that the light hydrocarbon lift gas and stripping gas can be obtained from sources other than by subjecting the product to fractionation or phase separation.

Having thus presented a general description of the improved method and sequence of process steps of this invention, it is to be understood that minor modifications can be made thereto without departing from the scope thereof and no undue restrictions are to be imposed by reason of the specific examples presented.

I claim:

1. A method for catalytically cracking hydrocarbons in the presence of a crystalline aluminosilicate cracking catalyst which comprises:
    (a) separating the reaction product effluent of a hydrocarbon cracking process to obtain a hydrocarbon lift gas composed predominantly of hydrocarbons boiling below $C_6$ hydrocarbons from higher boiling hydrocarbon product materials,
    (b) combining hydrocarbon lift gas thus obtained and preheated sufficiently to provide a portion of the required endothermic heat of cracking with hot regenerated crystalline aluminosilicate cracking catalyst to form a suspension therewith,
    (c) passing said suspension at an elevated cracking temperature through an elongated confined cracking zone,
    (d) introducing a hydrocarbon feed to be cracked through a conduit extending into said suspension under conditions to effect conversion of said hydrocarbon feed in the range of 40 to about 90% while limiting the contact time of the hydrocarbon feed with the catalyst in the range of from about 0.5 to about 3 seconds by vertically adjusting said conduit,
    (e) separating hydrocarbon product effluent of said cracking from said catalyst after removal from said elongated cracking zone and,
    (f) separating said reaction product effluent as recited in (a) above.

2. The method of claim 1 wherein a portion of the hydrocarbon lift gas is combined with the hydrocarbon feed introduced to said suspension.

3. The method of claim 1 wherein a portion of the separated lift gas is employed to strip catalyst separated from reaction products.

References Cited

UNITED STATES PATENTS

| | | | |
|---|---|---|---|
| 2,312,681 | 3/1943 | Teter | 208—153 |
| 2,948,673 | 8/1960 | Hemminger | 23—288.3 |
| 2,967,878 | 1/1961 | Fenske et al. | 23—288.3 |
| 2,985,517 | 5/1961 | Harper | 23—288.3 |
| 2,994,659 | 8/1961 | Slyngstad et al. | 23—288.3 |
| 3,186,805 | 6/1965 | Gomory | 208—153 |
| 3,246,960 | 4/1966 | Sharp et al. | 208—153 |
| 2,416,023 | 2/1947 | Schulze et al. | 260—668 |
| 2,875,147 | 2/1959 | Engle | 208—59 |
| 3,202,603 | 8/1965 | Keith et al. | 208—107 |
| 3,248,319 | 4/1966 | Bowles et al. | 208—164 |
| 3,267,024 | 8/1966 | Vaell | 208—134 |
| 3,351,548 | 11/1967 | Payne et al. | 208—153 |

DELBERT E. GANTZ, *Primary Examiner.*

HERBERT LEVINE, *Assistant Examiner.*